(12) United States Patent
Jin et al.

(10) Patent No.: US 8,566,370 B2
(45) Date of Patent: Oct. 22, 2013

(54) RANKING MEDIA CONTENT FOR CLOUD-BASED SEARCHES

(75) Inventors: Zhiying Jin, Lexington, MA (US); Fang (Julie) Zhu, Woburn, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 275 days.

(21) Appl. No.: 12/968,915

(22) Filed: Dec. 15, 2010

(65) Prior Publication Data

US 2012/0158713 A1    Jun. 21, 2012

(51) Int. Cl.
*G06F 17/00* (2006.01)
(52) U.S. Cl.
USPC ........... 707/821; 707/609; 707/705; 707/812; 707/813
(58) Field of Classification Search
USPC .......................... 707/609, 705, 812, 813, 953
See application file for complete search history.

(56) References Cited

U.S. PATENT DOCUMENTS

| | | | | |
|---|---|---|---|---|
| 2010/0280973 | A1* | 11/2010 | Banker | 705/400 |
| 2010/0281399 | A1* | 11/2010 | Banker | 715/758 |
| 2011/0065490 | A1* | 3/2011 | Lutnick | 463/16 |

* cited by examiner

*Primary Examiner* — Sana Al Hashemi (57) ABSTRACT

A device receives, from a user device, a search query for media content within a content delivery network. The device identifies a group of relevant media content in the content delivery network, where the identifying is based on the search query, access restrictions of particular media content within the content delivery network, and/or a capability of the user device to present particular types of media content. The device associates sub-scores with each piece of media content in the group of relevant media content, and calculates a total score, for each piece of media content in the group of relevant media content, based on the sub-scores. The device ranks each piece of media content in the group of relevant media content, based on the total scores for each piece of media content, and sends, based on the search query, a list of the ranked, relevant media content to the user device.

17 Claims, 7 Drawing Sheets

FIG. 2

RANKING MEDIA CONTENT FOR CLOUD-BASED SEARCHES

BACKGROUND

Some network service providers offer cloud-based media storage that allows customers to upload media content (e.g., music files, photos, videos, etc.) to a distributed network, sometimes referred to as a cloud, for backup and/or sharing. Media content stored in the distributed network can be accessed from different access points and/or devices connected to the distributed network. Customers may, for example, search, browse, add, and/or delete media content through any of a mobile interface, a web-based interface, or a television interface.

DETAILED DESCRIPTION OF PREFERRED EMBODIMENTS

The following detailed description refers to the accompanying drawings. The same reference numbers in different drawings may identify the same or similar elements.

Systems and/or methods described herein may identify and rank search results for media content within a cloud-based media storage network. The systems and/or methods may allow customers to search their own media content, partially-shared content (e.g., content shared among friends), and public content. The systems and/or methods may perform searches across multiple types of content and return search results in a ranked order according to particular rules that improve a customer's search experience in a content storage cloud environment. In addition, content may be retrieved via a variety of different devices.

Figure 1:
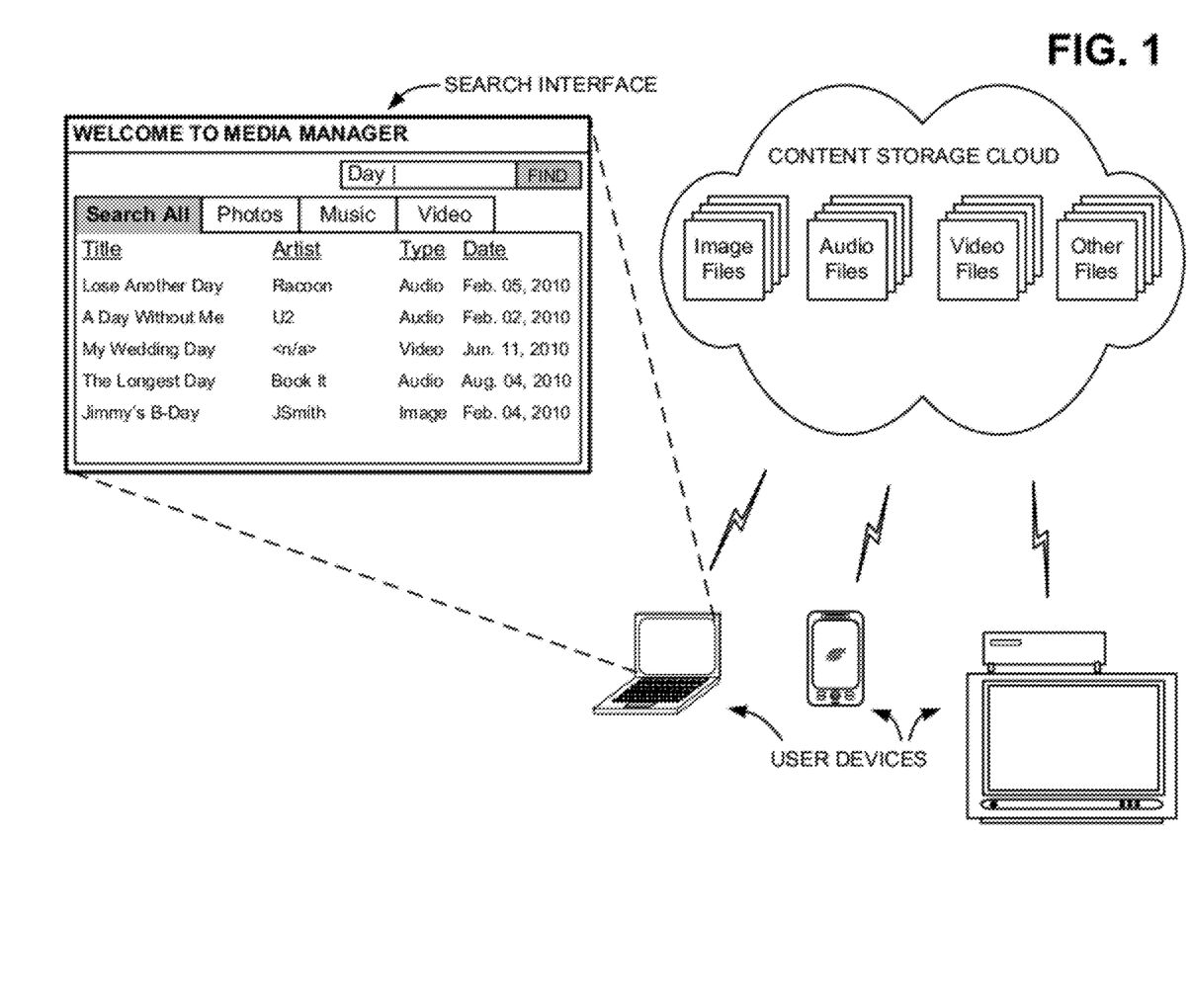
FIG. 1 is an illustration of a concept described herein.

FIG. 1 provides an illustration of concepts described herein. Customers, using user devices, may store media content in a content storage cloud (e.g., a cloud-based network storage system). Media content stored in the content storage cloud may include, for example, image files (e.g., photographs, etc.), audio files (e.g., music, recorded books, etc.), video files (e.g., home movies, recordings, and/or other video content), and other types of files (e.g., text-based files, etc.). Stored content may be given (e.g., by the user) an access designation, such as "personal" (e.g., available to only the user who uploaded the content), "partially-shared" (e.g., available to designated users), and "public" (e.g., available to all users). As shown in FIG. 1, users may utilize various kinds of user devices (such as, a laptop computer, a mobile phone, and a set-top box/television (STB/TV), as shown in FIG. 1) to search, retrieve, add, and/or delete media content in the content storage cloud. For example, a user may upload a media file using the laptop computer and may later retrieve the same content using the STB/TV interface.

As shown in FIG. 1, a service provider (e.g., managing the content storage cloud) may supply a search interface (such as a web-based interface, interactive TV interface, mobile interface, etc.) that may be used on the user devices to search for media content within the content storage cloud. According to the systems and/or methods described herein, a search may be conducted across multiple media types and results may be restricted to only content accessible to the particular user. The search results may be ranked according to factors such as, the access designation of the content, the type of user device utilized to provide the search request, the type of media content, a user profile/history, the relevance of the search results, and/or other factors. Thus, the systems and/or methods may provide users with search results targeted, for example, to the type of access designation associated with the content, the preferences of the user, and the capabilities of the user device to utilize the content.

In one example implementation, a server device may receive, from a user device, a search query for media content within a content delivery network. The server device may identify a group of relevant media content in the content delivery network, based on the search query and access restrictions of particular media content within the content delivery network. The server device may associate category sub-scores with each piece of media content in the group of relevant media content, and may calculates a total score, for each piece of media content in the group of relevant media content, based on the category sub-scores. The server device may rank each piece of media content in the group of relevant media content, based on the total scores for each piece of media content, and may send, based on the search query, a list of the ranked, relevant media content to the user device.

As used herein, the terms "customer" and/or "user" may be used interchangeably. Furthermore, the terms "customer" and/or "user" are intended to be broadly interpreted to include a user device (e.g., a mobile communication device) or a user of a user device.

Figure 2:
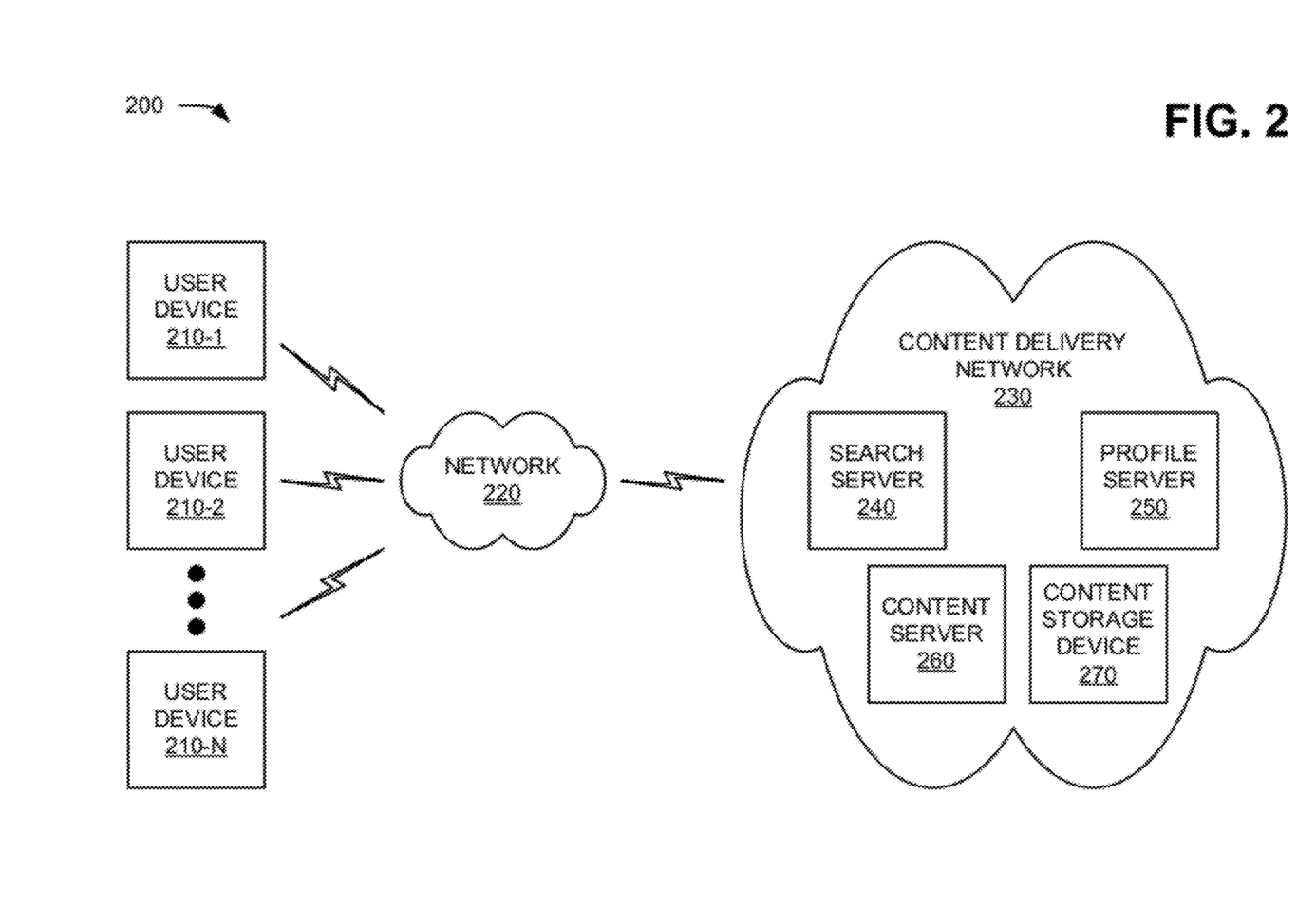
FIG. 2 is a diagram of an example network in which systems and/or methods described herein may be implemented.

FIG. 2 is a diagram of an example network 200 in which systems and/or methods described herein may be implemented. As illustrated, network 200 may include multiple user devices 210-1, 210-2, . . . , 210-N (referred to herein collectively as "user devices 210" or generically as "user device 210"), a network 220, and a content delivery network 230. Content delivery network 230 may include a search server 240, a profile server 250, a content server 260, and a content storage device 270. Components of network 200 may interconnect via wired and/or wireless connections. Three user devices 210 and a single network 220, content delivery network 230, search server 240, profile server 250, content server 260, and content storage device 270 have been illustrated in FIG. 2 for simplicity. In practice, there may be more user devices 210, networks 220, content delivery networks 230, search servers 240, profile servers 250, content servers 260, and/or content storage devices 270.

User device 210 may include any computation or communication device that is capable of communicating with content distribution network 230. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, a tablet (or "pad") computer, a personal computer, a set top box (STB), a television, a personal gaming system, a content recording device (e.g., a camera, a video camera, a digital video recorder (DVR), etc.), or another type of computation or communication device. User device 210 may communicate with content distribution network 230 in order to perform a search. In one example, a user of user device 210 may enter a search query (e.g., that includes key words associated with subject matter to be searched) into user device 210 (e.g., via a search engine, a web browser, etc.). The user may cause the query to be sent to content distribution network 230 in order to obtain information associated with the subject matter of the search query.

Network 220 may include any type of network, such as a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks. Network 220 may provide services and/or resources to facilitate communications between user device 210 and content delivery network 230. In one example implementation, network 220 may include a wireless access network for user device 210, such as a Long Term Evolution (LTE) network, an advanced LTE network, etc.

Content delivery network 230 may include a network-based storage cloud of content, such as personal video content, public video content, and/or other multimedia content. Content delivery network 230 may include a computer system, an application, a cable head-end, and/or a broadcasting device capable of providing video content in a variety of formats, instructions, and/or other information. Content delivery network 230 may include, for example, one or more servers and/or databases to store and provide content that is the subject of a content request from user device 210. Content delivery network 230 may also include one or more transcoding servers that may transcode (or convert) video content to a format that user device 210 may utilize (e.g., playback). In one example, content delivery network 230 may receive content from user devices 210 for storage, may store the content, and may provide, to the user devices, a content link associated with the stored content. Content delivery network 230 may receive a request for video content (e.g., the content link) from user device 210, and may provide the requested video content to user device 210 (e.g., in a format suitable for user device 210).

Search server 240 may include one or more server devices, or other types of computation or communication devices, that gather, process, and/or provide information in a manner described herein. For example, search server 240 may receive and/or store media content location information (such as URLs), access restrictions (e.g., personal, partially-shared, public, etc.), media content metadata (e.g., information regarding title, length, rating, director, performer, etc.), and/or other data associated with media content (e.g., file size, created/modified dates, popularity indicators, etc.). This data may be obtained from profile server 250, content server 260, and/or a "crawler" associated with content delivery network 230 to collect data. The data (e.g., from profile server 250, content server 260, and/or the crawler) may be stored, for example, in a separate search index. Search server 240 may receive media content search queries from user device 210 and provide ranked lists of content in response thereto. In one implementation, search server 240 may be combined with other server functions that provide media management for content delivery network 230.

Profile server 250 may include one or more server devices, or other types of computation or communication devices, that gather, process, and/or provide information in a manner described herein. For example, profile server 250 may store and update user profiles for accounts associated with user devices 210. The user profiles may include various information regarding a user, such as, for example, types of services to which the user has subscribed, a list of media content recently stored/retrieved by the user, ratings of media content by the user, a user device identifier (e.g., a media player identifier, a mobile device identifier, a set top box identifier, a personal computer identifier) for user device 210, an application identifier associated with an application being used on user device 210, etc. Search server 240 may, for instance, access profile server 250 to obtain information relating to user device 210 or the user of user device 210.

Content server 260 may include one or more server devices, or other types of computation or communication devices, that gather, process, and/or provide information in a manner described herein. For example, content server 260 may receive media content (e.g., from user devices 210), may index the media content, and may provide the media content to content storage device 270 for storage. Content server 260 may deliver media content (e.g., upon a request from user device 210) in a format suitable for user device 210.

Content storage device 270 may include one or more devices that receive and maintain content uploaded from user devices 210. Content storage device 270 may include, for example, a database, a server, or another device with a memory component. Content storage device 270 may store, for example, media content and/or links to media content that may be accessed by another device, such as content sever 260. In one implementation, content storage device 270 may be a distributed component.

According to an implementation herein, search server 240 may receive a media content search query from user device 210. In one implementation, the search query may be generated after a user of user device 210 has logged in to an account, or otherwise received permission, to access content delivery network 230. The login process may also allow content delivery network 230 to associate user device 210 with a particular user profile (e.g., in profile server 250). Search server 240 may conduct a search of all media content (e.g., included in the search index of search server 240) that is accessible to the user of user device 210. Search server 240 may compile an initial set of results based on, for example, a keyword search. Search server 240 may use information from the search index, profile server 250, and/or content server 260 to rank the initial results according to factors, such as the access designation of the content, the type of user device utilized to provide the search request, the type of media content, a user profile/history, the relevance of the search results, and/or other factors. Search server 240 may provide the ranked search results to user device 210 with links to allow the user to select content from the list of search results.

Although FIG. 2 shows example components of network 200, in other implementations, network 200 may include fewer components, different components, differently arranged components, and/or additional components than those depicted in FIG. 2. Alternatively, or additionally, one or more components of network 200 may perform one or more tasks described as being performed by one or more other components of network 200. For example, in one implementation, the functions of two or more of search server 240, profile server 250, content server 260, or content storage device 270 may be combined in a single device.

Figure 3:
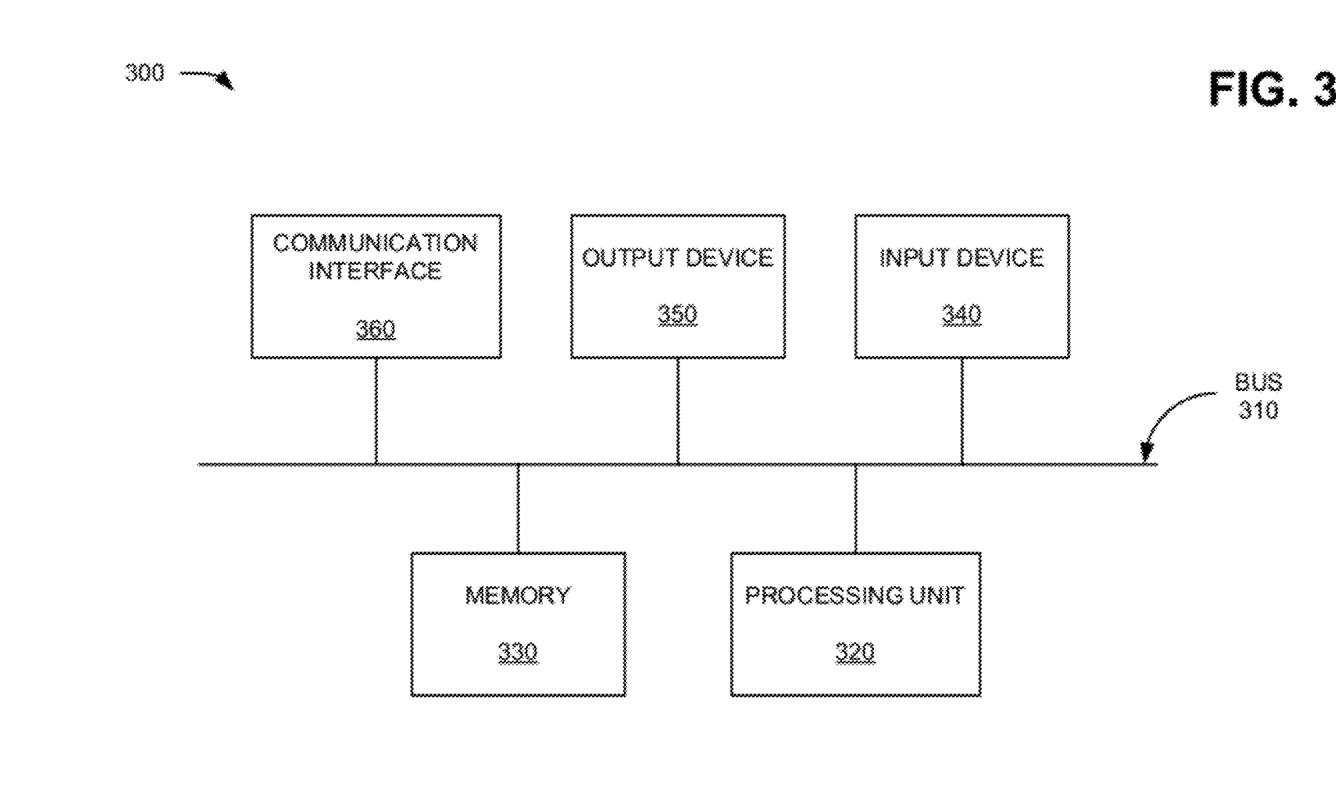
FIG. 3 is a diagram of example components of one or more of the devices of the network depicted in FIG. 2.

FIG. 3 is a diagram of example components of a device 300 that may correspond to one of the components of network 200. As illustrated, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other components of network 200.

As described herein, device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more tasks described as being performed by one or more other components of device 300.

Figure 4:
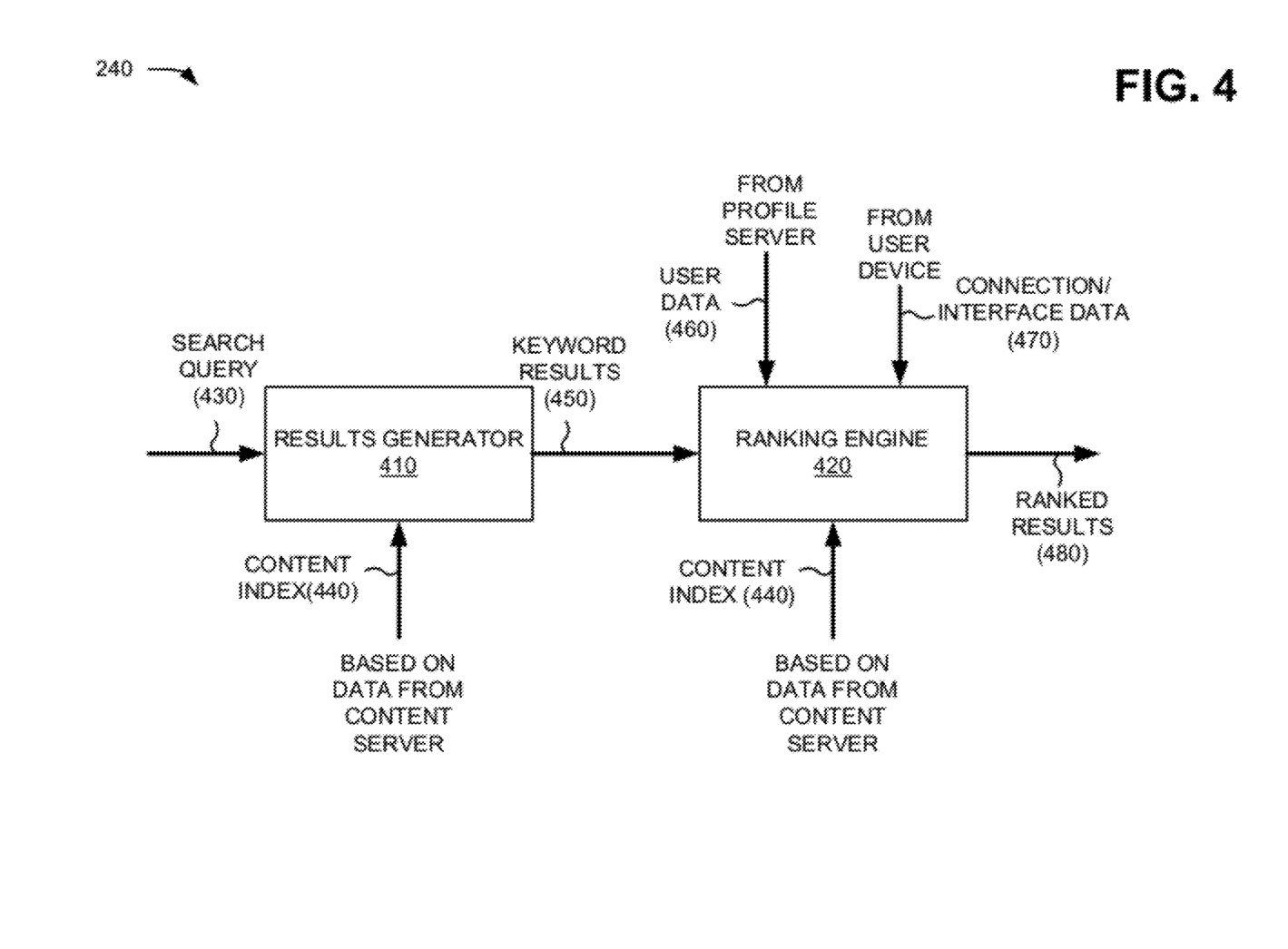
FIG. 4 is a diagram of example functional components of a search server of the network depicted in FIG. 2.

FIG. 4 is a diagram of example functional components of search server 240. In one implementation, the functions described in connection with FIG. 4 may be performed by one or more components of device 300 (FIG. 3). As shown in FIG. 4, search server 240 may include results generator 410 and ranking engine 420.

Results generator 410 may include hardware or a combination of hardware and software to receive a search query and provide a list of results responsive the search query. For example, as shown in FIG. 4, results generator 410 may receive a search query 430 from user device 210. Search query 430 may include, for example, one or more search terms for media stored in content delivery network 230. In response to search query 430, results generator 410 may retrieve/analyze content index 440 (e.g., an index of media content data based on information from content server 260) to determine a group of media content relevant to a user of user device 210. Media content relevant to the user of user device 210 (e.g., as indicated by content index 440) may include, for example, content with access restrictions of "personal" (e.g., with an indicator for the user of user device 210), "partially-shared" (e.g., where the user is listed as a friend), and "public" (e.g., available to any user). Additionally, or alternatively, one or more other types of information may be used to determine media content that is relevant to user device 210. For example, relevant content may also be determined based on a preference, of a user, to present a type of media content on a particular user device 210 and/or a capability, of a requesting user device 210, to present particular types of media.

Using content index 440, results generator 410 may perform, for example, a keyword search to match terms in search query 430 to keywords and/or other metadata associated with content index 440. Based on the keyword search, results generator 410 may obtain a group of keyword results 450, which may be a subset of content index 440. Results generator 410 may provide keyword results 450 to ranking engine 420.

Ranking engine 420 may include hardware or a combination of hardware and software to rank keyword results based on criteria specific to a content storage cloud environment. For example, ranking engine 420 may receive keyword results 450 and may apply one or more mechanisms to rank keyword results based on, for example, the access designation of the content, the type of user device utilized to provide the search request, the type of media, a user profile/history, the relevance of the search results, and/or other factors. Ranking engine 420 may receive user data 460 (e.g., from profile server 250) and connection/interface data 470 (e.g., from user device 210 and/or an intermediate network device), and retrieve content index 440. Ranking engine 420 may apply a set of ranking rules using user data 460, connection/interface data 470, and/or content index 440 to determine scores of certain categories for each relevant result. The category scores may then be weighted and totaled to generate a total score for each relevant result. The scored relevant results may then be ranked to generate a list of ranked results 480 that may be provided to user device 210 (e.g., in response to search query 430).

Although FIG. 4 shows example functional components of search server 240, in other implementations, search server 240 may include fewer functional components, different functional components, differently arranged functional components, and/or additional functional components than depicted in FIG. 4. Alternatively, or additionally, one or more functional components of search server 240 may perform one or more tasks described as being performed by one or more other functional components of search server 240.

Figure 5:
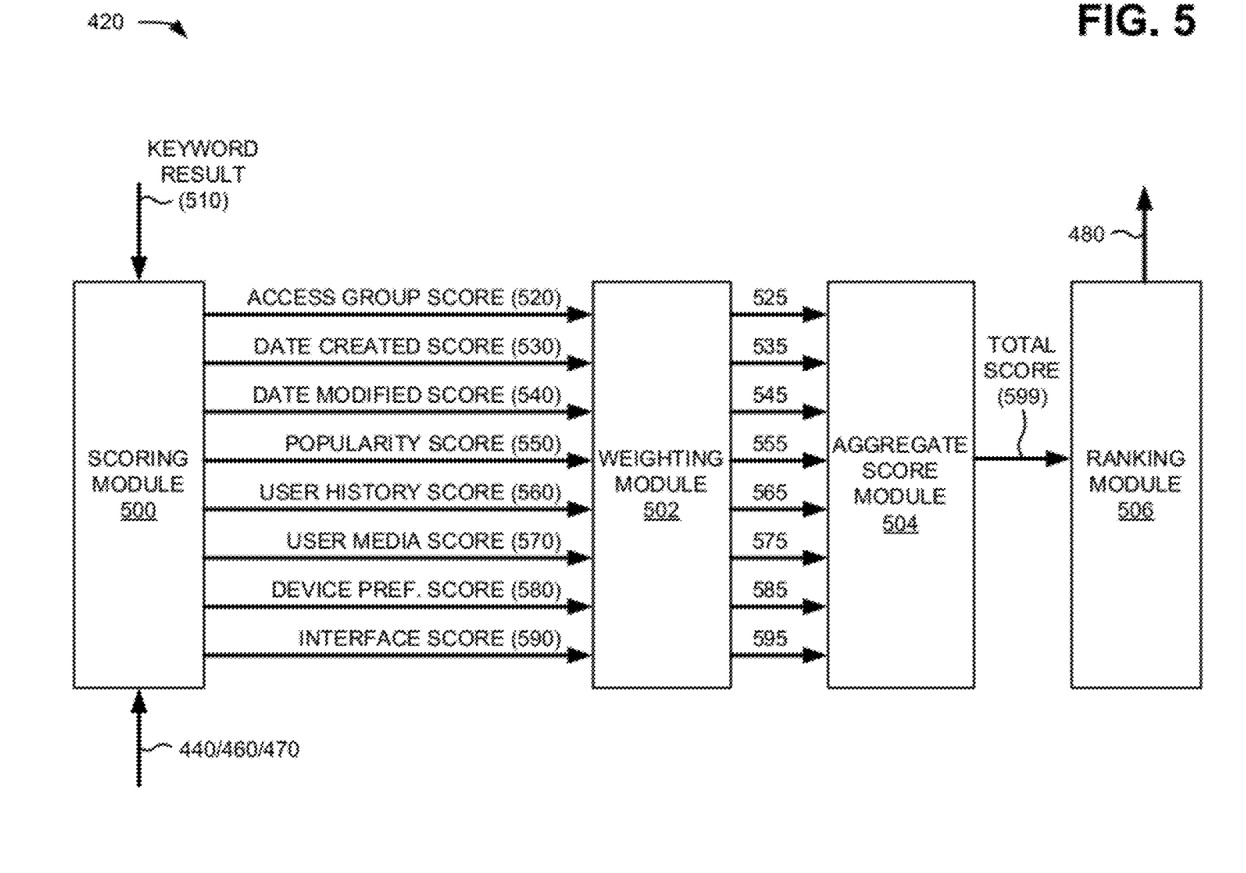
FIG. 5 is a diagram of example functional components of a ranking engine depicted in FIG. 4.

FIG. 5 is a diagram of example functional components of ranking engine 420. In one implementation, the functions described in connection with FIG. 5 may be performed by one or more components of device 300 (FIG. 3). As shown in FIG. 5, ranking engine 420 may include a scoring module 500, a weighting module 502, an aggregate score module 504, and a ranking module 506.

Scoring module 500 may include hardware or a combination of hardware and software to generate sub-scores, for each keyword result, in particular categories. For example, scoring module 500 may receive a keyword result 510, which may correspond to one of keyword results 450 (FIG. 4). Keyword result 510 may include a descriptor for a media content item that is relevant to user device 210 (e.g., the particular user device 210 submitting search query 430 (FIG. 4)). Scoring module 500 may receive user data 460, connection/interface data 470, and/or content index 440 to calculate sub-scores for keyword result 510. Sub-scores that may be calculated by scoring module 500 may include an access group score 520, a date created score 530, a date modified score 540, a popularity score 550, a user history score 560, a user media score 570, a device preference score 580, and an interface score 590.

Access group score 520 may include a value to reflect the type of access (e.g., personal, partially-shared, or public) assigned to the media content indicated by keyword result 510. For example, scoring module 500 may allocate a highest score to media content marked as personal, a lower score for partially-shared media content, and a lowest score for public media content. The type of access assigned to keyword result 510 may be, for example, included with keyword result 510 or obtained from content index 440.

Date created score 530 may include a value to reflect the date/time the media content indicated by keyword result 510 was created or uploaded to content delivery network 230. For example, scoring module 500 may allocate a highest score to media content that was uploaded most recently (e.g., within a day) and provide incrementally lower scores for older media content based on certain time segments (e.g., several days, a week, two weeks, a month, etc.) or on a linear scale. In another implementation, different time-based score calculations may be used to calculate date created score 530. The uploaded date/time assigned to keyword result 510 may be, for example, included with keyword result 510 or obtained from content index 440.

Date modified score 540 may include a value to reflect the date/time the media content indicated by keyword result 510 was most-recently updated on content delivery network 230. For example, scoring module 500 may allocate a highest score to media content that was most recently updated and provide incrementally lower scores for less current media content based on certain time segments (e.g., several days, a week, two weeks, a month, etc.) or on a linear scale. In another implementation, different time-based score calculations may be used to calculate date modified score 540. The modified date/time assigned to keyword result 510 may be, for example, included with keyword result 510 or obtained from content index 440.

Popularity score 550 may include a value to reflect the popularity of the media content indicated by keyword result 510. The popularity of the media content may be measured, for example, by a number of times the media content has been accessed (e.g., within a recent time interval) by user devices 210 generally or by the particular user device 210 that submitted the search query (e.g., search query 430). For example, scoring module 500 may allocate a highest score to most popular media content and lower scores to less popular content. In one implementation, scoring module 500 may base popularity score 550 on particular threshold levels of activity (e.g., for either all user devices 210 or the particular user device 210). In another implementation, scoring module 500 may base popularity score 550 on a relative level of activity for the media content indicated by keyword result 510 (e.g., compared to other media content). Popularity data associate with keyword result 510 may be, for example, included with keyword result 510 or obtained from content index 440.

User history score 560 may include a value to reflect selections of past searches by a user of user device 210. For example, scoring module 500 may assign a value to user history score 560 for the media content indicated by keyword result 510 if the media content was previously selected by the user for the same, or a similar, search query. User selection history associated with keyword result 510 may be, for example, obtained from user data 460.

User media score 570 may include a value to reflect a preference, by a user of user device 210, for a particular type of media (such as music, videos, or photographs). For example, if a user of user device 210 demonstrates a preference for videos, scoring module 500 may assign a higher score to the media content indicated by keyword result 510 when the media content is a video. Conversely, if a user of user device 210 demonstrates a preference for videos, scoring module 500 may assign a lower (or null) score to the media content indicated by keyword result 510 when the media content is a music/audio file. The user preference may be determined, for example, by monitoring user behavior (e.g., during past interactions with content delivery network 230) and/or by a user registering a preference (e.g., that can be stored if profile server 250) for a particular media format (e.g., videos) or over other media formats. User media type selection history associated with keyword result 510 may be, for example, obtained from user data 460.

Device preference score 580 may include a value to reflect a preference, of a user, to present a type of media content on a particular device. For example, a user may primarily listen to music and view photographs on one particular user device 210 (e.g., a smart phone with an MP3 player) and may primarily watch videos on another user device (e.g., a STB/TV). If the media content indicated by keyword result 510 is a video and the requesting user device 210 is a smart phone, scoring module 500 may assign a low (or null) device preference score 580 to keyword result 510. Conversely, if the media content indicated by keyword result 510 is a video and the requesting user device 210 is a STB/TV, scoring module 500 may assign a high user device preference score 580 to keyword result 510. Media preferences for particular user devices associated with keyword result 510 may be, for example, obtained from user data 460, while the type of user device 210 may be, for example, obtained from connection/interface data 470.

Interface score 590 may include a value to reflect a capability, of a requesting user device 210, to present particular types of media. For example, if user device 210 is a particular model (e.g., legacy) of mobile device, a certain media content (e.g., HD video) may not be supported on user device 210. Similarly, a certain wireless connection (e.g., used by mobile devices) may not efficiently support large downloads. Thus, if the media content indicated by keyword result 510 is above a certain file size (e.g., over 500 MB) and the requesting user device 210 is certain type of device (e.g., a mobile device), scoring module 500 may assign a low (or null) interface score 590 to keyword result 510. File sized for media content associated with keyword result 510 may be included within keyword result 510 or obtained from content index 440, while the type of user device 210 and wireless connection may be, for example, obtained from connection/interface data 470.

Scoring module 500 may calculate sub-scores (e.g., access group score 520, date created score 530, date modified score 540, popularity score 550, user history score 560, user media score 570, device preference score 580, and/or interface score 590) for each keyword result 510, and provide each sub-score to weighting module 502.

Weighting module 502 may include hardware or a combination of hardware and software to apply a weight (e.g., significance) value to each sub-score received from scoring module 500. For example, weighting module 502 may apply a different weight value to one or more of access group score 520, date created score 530, date modified score 540, popularity score 550, user history score 560, user media score 570, device preference score 580, and/or interface score 590 to generate weighted access group score 525, weighted date created score 535, weighted date modified score 545, weighted popularity score 555, weighted user history score 565, weighted user media score 575, weighted device preference score 585, and/or weighted interface score 595.

Weight values (e.g., applied by weighting module 502) for each sub-score may be configured to give ranking preference to particular sub-scores that may be more relevant in the context of a cloud-based search. For example, scores involving access to particular media types, such as, access group score 520, user media score 570, device preference score 580, and/or interface score 590, may be weighted more heavily than scores relating to the particular media content (e.g., date created score 530, date modified score 540, popularity score 550, and/or user history score 560). Weighting module 502 may provide weighted access group score 525, weighted date created score 535, weighted date modified score 545, weighted popularity score 555, weighted user history score 565, weighted user media score 575, weighted device preference score 585, and/or weighted interface score 595 to aggregate score module 504.

Aggregate score module 504 may include hardware or a combination of hardware and software to combine the weighed sub-scores received from weighting module 504 into a total (e.g., aggregate) score for keyword result 510. The total score may be provided to ranking module 506, as indicated by reference number 599.

Ranking module 506 may include hardware or a combination of hardware and software to receive total score 599 for each keyword result 510 (e.g., for all of keyword results 450 generated by results generator 410 of FIG. 4). Ranking module 506 may rank each keyword result 510, among the other keyword results 510, based on total score 599 assigned to each keyword result 510. When total scores 599 for all keyword results 510 have been received, ranking module 506 may generate ranked results 480 that may be provided to user device 210 (e.g., in response to search query 430).

Although FIG. 5 shows example functional components of ranking engine 420, in other implementations, ranking engine 420 may include fewer functional components, different functional components, differently arranged functional components, and/or additional functional components than depicted in FIG. 5. Furthermore, fewer sub-scores, different sub-scores, differently arranged sub-scores, and/or additional sub-scores than depicted in FIG. 5 may be used. Alternatively, or additionally, one or more functional components of ranking engine 420 may perform one or more tasks described as being performed by one or more other functional components of ranking engine 420.

Figure 6:
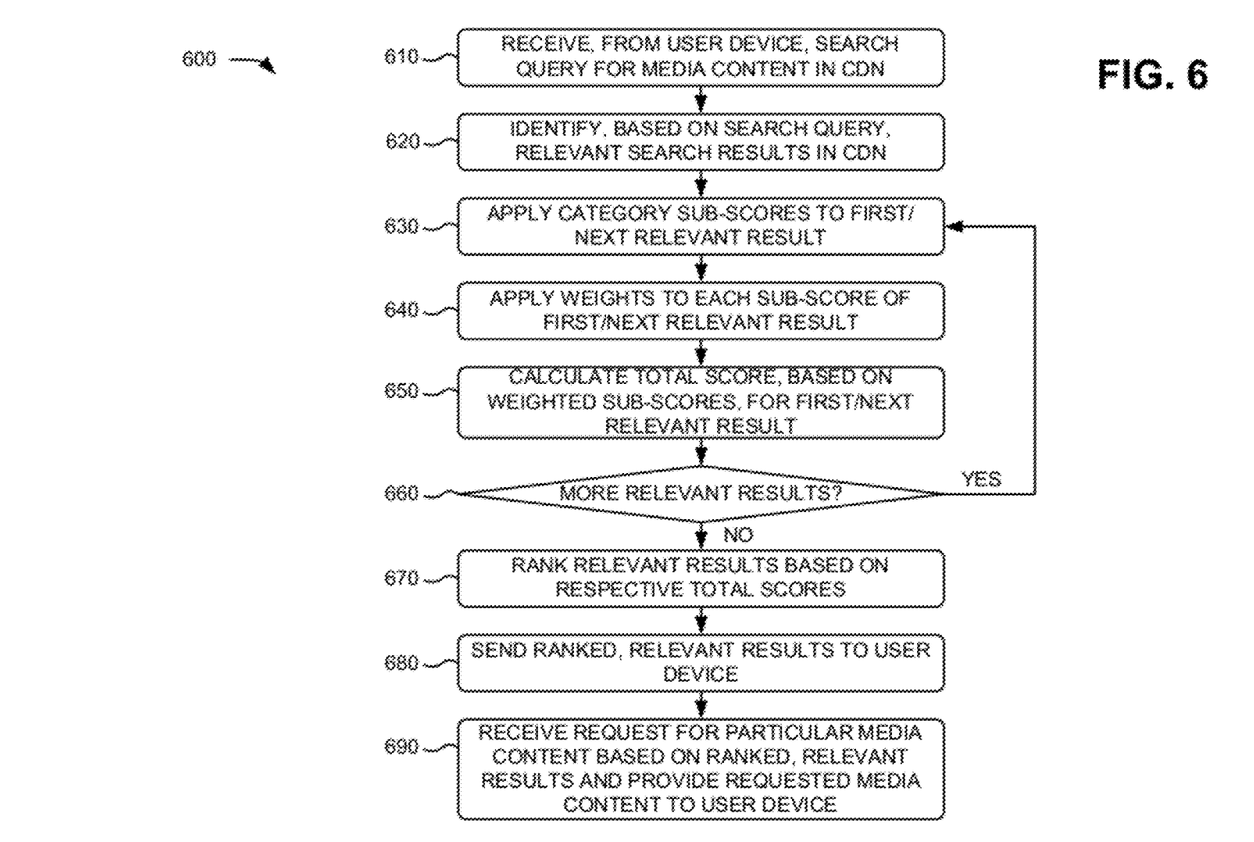
FIGS. 6 and 7 are flow charts of an example process for ranking media content for a cloud-based search according to an implementation described herein.
Figure 7:
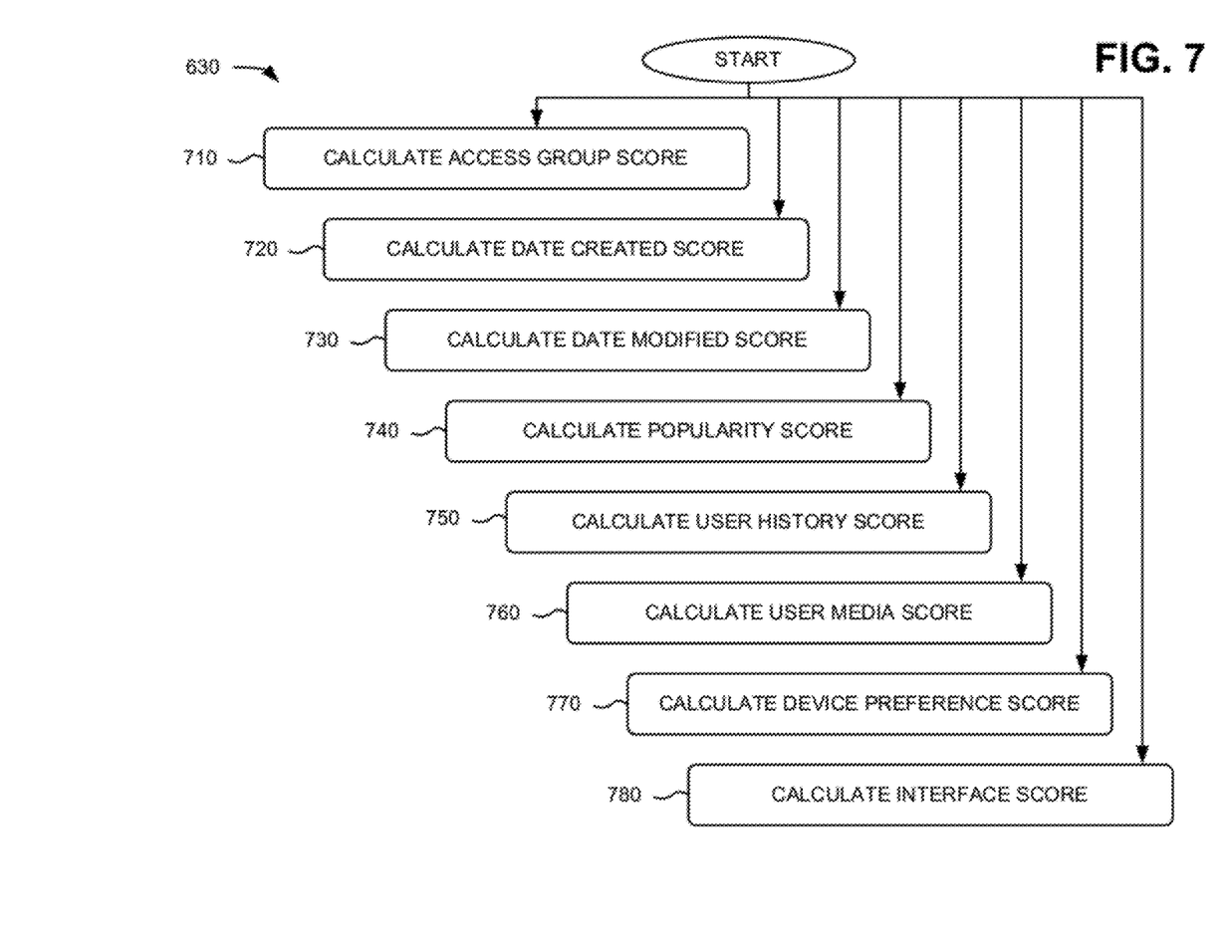

FIGS. 6 and 7 are flow charts of an example process 600 for ranking media content for a cloud-based search according to an implementation described herein. In one implementation, process 600 may be performed by search server 240. In another implementation, some or all of process 600 may be performed by another device or group of devices, including or excluding search server 240.

As illustrated in FIG. 6, process 600 may include receiving, from a user device, a search query for media content in a content delivery network ("CDN") (block 610), and identifying, based on the search query, relevant search results in the content delivery network (block 620). For example, in implementations described above in connection with FIG. 4, search server 240 (e.g., results generator 410) may receive search query 430 from user device 210. Search query 430 may include, for example, one or more search terms for media stored in content delivery network 230. In response to search query 430, results generator 410 may analyze content index 440 (e.g., an index of media content data based on information from content server 260) to determine a group of media content relevant to a user of user device 210. Media content relevant to the user of user device 210 (e.g., as indicated by content index 440) may include, for example, content with access restrictions of "personal" (e.g., with an indicator for the user of user device 210), "partially-shared" (e.g., where the user is listed as a friend), and "public" (e.g., available to any user). Additionally, or alternatively, one or more other types of information may be used to determine media content that is relevant to user device 210. For example, relevant content may also be determined based on a preference, of a user, to present a type of media content on a particular user device 210 and/or a capability, of a requesting user device 210, to present particular types of media. Using available content data 440, results generator 410 may perform, for example, a keyword search to match terms in search query 430 to keywords and/or other metadata associated with available content data 440. Based on the keyword search, results generator 410 may obtain a groups of keyword results 450, which may be a subset of available content data 440. Results generator 410 may provide keyword results 450 to ranking engine 420.

As further shown in FIG. 6, process 600 may include applying category sub-scores to a first relevant result (block 630). For example, in implementations described above in connection with FIG. 4, search server 240 (e.g., ranking engine 420) may include hardware or a combination of hardware and software to rank keyword results based on criteria specific to a content storage cloud environment. For example, ranking engine 420 may receive keyword results 450 and may apply one or more mechanisms to rank keyword results based on, for example, the access designation of the content, the type of user device utilized to provide the search request, the type of media, a user profile/history, the relevance of the search results, and/or other factors. Ranking engine 420 may apply a set of ranking rules using user data 460, connection/interface data 470, and/or content index 440 to determine scores of certain categories for each relevant result.

Process 600 may include applying weights to each sub-score of the first relevant result (block 640), and calculating a total score, based on the weighted sub-scores, for the first relevant result (block 650). For example, in implementations described above in connection with FIGS. 4 and 5, the category scores may then be weighted and totaled to generate a total score for each relevant result. Weight values (e.g., applied by weighting module 502) for each sub-score may be configured to give ranking preference to particular sub-scores that may be more relevant in the context of a cloud-based search. For example, scores involving access to particular media types, such as, access group score 520, user media score 570, device preference score 580, and/or interface score 590, may be weighted more heavily than scores relating to the particular media content (e.g., date created score 530, date modified score 540, popularity score 550, and/or user history score 560). Aggregate score module 504 may combine the weighed sub-scores received from weighting module 504 into a total (e.g., aggregate) score 599 for each keyword result 510.

Returning to FIG. 6, process 600 may include determining if there are more relevant results to process (block 660). If there are more relevant results to process (block 660—YES), process 600 may return process block 630 to apply category sub-scores to a next relevant result. If there are no more relevant results to process (block 660—NO), the relevant results may be ranked based on the respective total scores (block 670), and the ranked, relevant results may be provided to the user device (block 680). For example, in implementations described above in connection with FIGS. 4 and 5, search server 240 (e.g., ranking engine 420) may collect total scores 599 from each keyword result and rank the scored relevant results to generate a list of ranked results 480 that may be provided to user device 210 (e.g., in response to search query 430). The list of rank results may include links (e.g., to content server 360 or another device in content deliver network 230) to each ranked result to allow the user to select media content from the list of search results.

Process 600 may include receiving a request for media content, based on the ranked, relevant results, and providing the requested media content to the user device (block 690). For example, a user of user device 210 may select, from the list of ranked results, a link for particular media content. The link may include, for example, a URL for the particular media content within content delivery network 230. Using the URL, user device 210 may provide a request to content delivery network 230 for the selected media content. The request may be received by content delivery network 230 and content delivery network 230 may provided the requested media content to user device 210 in accord with the request.

Process block 630 may include the process blocks depicted in FIG. 7. As shown in FIG. 7 process block 630 may include calculating an access group score (block 710), calculating a date created score (block 720), calculating a date modified score (block 730), calculating a popularity score (block 740), calculating a user history score (block 750), calculating a user media score (block 760), calculating a device preference score (block 770), and/or calculating an interface score (block 780). For example, in implementations described above in connection with FIG. 5, search server 240 (e.g., scoring module 500) may generate sub-scores, for each of the keyword results, in particular categories. Sub-scores that may be calculated by scoring module 500 may include access group score 520, date created score 530, date modified score 540, popularity score 550, user history score 560, user media score 570, device preference score 580, and interface score 590.

Systems and/or methods described herein may provide ranked search results in response to search queries for media content within a cloud-based media storage network. The systems and/or methods may search multiple types of media content with different types of access restrictions. The systems and/or methods may determine relevant search results and rank the results based on the type of device used for the search, information about the user requesting the search, and/or information about the type of media.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6 and 7, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a computing device, the method comprising:
   receiving, by the computing device and from a user device, a search query for media content within a content delivery network;
   identifying, by the computing device, a group of relevant media content in the content delivery network, where the group of relevant media content is based on the search query and one or more of:
      access restrictions of particular media content within the content delivery network,
      a preference, of a user of the user device, to present a type of media content on the user device, or
      a capability, of the user device, to present particular types of media content;
   associating, by the computing device, a plurality of sub-scores with each piece of media content in the group of relevant media content, each sub-score of the plurality of sub-scores relating to a different category for scoring search results, wherein the associating comprises one or more of:
      calculating a date created score that includes a value to reflect a time a piece of media content in the group of relevant media content was created or uploaded to the content delivery network,
      calculating a date modified score that includes a value to reflect a time a piece of media content in the group of relevant media content was most-recently updated on the content delivery network,
      calculating a popularity score that includes a value to reflect a popularity of a piece of media content in the group of relevant media content, or
      calculating a user history score that includes a value to reflect selections of past searches by the user of the user device;
   calculating, by the computing device, a total score, for each piece of media content in the group of relevant media content, based on the plurality of sub-scores;
   ranking, by the computing device, each piece of media content in the group of relevant media content, based on the total scores for each piece of media content; and
   sending, by the computing device and based on the search query, a list of the ranked, relevant media content to the user device.

2. A device, comprising:
a memory to store a plurality of instructions; and
a processor to execute instructions in the memory to:
  receive, from a user device, a search query for media content within a content delivery network;
  identify a group of relevant media content in the content delivery network, where the identifying is based on the search query and one or more of:
    access restrictions of particular media content within the content delivery network, or
    a capability, of the user device, to present particular types of media content;
  associate a plurality of sub-scores with each piece of media content in the group of relevant media content, each sub-score of the plurality of sub-scores relating to a different category for scoring search results, wherein the plurality of sub-scores include one or more of:
    a date created score that includes a value to reflect a time a piece of media content in the group of relevant media content was created or uploaded to the content delivery network,
    a date modified score that includes a value to reflect a time a piece of media content in the group of relevant media content was most-recently updated on the content delivery network,
    a popularity score that includes a value to reflect a popularity of a piece of media content in the group of relevant media content, or
    a user history score that includes a value to reflect selections of past searches by a user of the user device;
  apply a weight to each of the plurality of sub-scores to create a weighted sub-score for each of the plurality of sub-scores;
  calculate a total score, for each piece of media content in the group of relevant media content, based on the weighted sub-scores;
  rank each piece of media content in the group of relevant media content, based on the total scores for each piece of media content; and
  send, based on the search query, a list of the ranked, relevant media content to the user device.

3. A non-transitory computer-readable medium that includes instructions for execution by one or more processors, the computer-readable medium comprising one or more instructions to:
  receive, from a user device, a search query for media content within a content delivery network;
  identify a group of relevant media content in the content delivery network, wherein the identifying is based on the search query and one or more of:
    access restrictions of particular media content within the content delivery network,
    a preference, of a user of the user device, to present a type of media content on the user device, or
    a capability, of the user device, to present particular types of media content;
  associate a plurality of sub-scores with each piece of media content in the group of relevant media content, wherein each sub-score of the plurality of sub-scores relates to a different category for scoring search results, wherein the plurality of sub-scores include one or more of:
    a date-created score that includes a value to reflect a time a piece of media content in the group of relevant media content was created or uploaded to the content delivery network, or
    a popularity score that includes a value to reflect the popularity of a piece of media content in the group of relevant media content;
  calculate a total score, for each piece of media content in the group of relevant media content, based on the plurality of sub-scores;
  rank each piece of media content in the group of relevant media content, based on the total scores for each piece of media content; and
  send, based on the search query, a list of the ranked, relevant media content to the user device.

4. The method of claim 1, further comprising:
  applying a weight to each of the plurality of sub-scores to create a weighted sub-score for each of the plurality of sub-scores, where calculating the total score, for each piece of media content in the group of relevant media content, based on the one of the plurality of sub-scores comprises:
    calculating a total score, for each piece of media content in the group of relevant media content, based on the weighted sub-scores.

5. The method of claim 1, where associating the plurality of sub-scores with each piece of media content in the group of relevant media content further comprises:
  calculating an interface score that includes a value to reflect a capability, of the user device, to present particular types of media.

6. The method of claim 1, where associating the plurality of sub-scores with each piece of media content in the group of relevant media content further comprises:
  calculating a device preference score that includes a value to reflect a preference, of a user, to present a type of media content on the user device.

7. The method of claim 1, where associating the plurality of sub-scores with each piece of media content in the group of relevant media content further comprises one or more of:
  calculating an access group score that includes a value to reflect a type of the access restrictions assigned to a piece of media content in the group of relevant media content, or
  calculating a user media score that includes a value to reflect a preference, by the user of the user device, for a particular type of media.

8. The method of claim 1, where the media content within the content delivery network includes:
  video files,
  audio files,
  image files, and
  text-based files.

9. The device of claim 2, where, when associating the plurality of sub-scores with each piece of media content in the group of relevant media content, the processor is further to:
  calculate an interface score that includes a value to reflect the capability, of the user device, to present particular types of media.

10. The device of claim 2, where, when associating the plurality of sub-scores with each piece of media content in the group of relevant media content, the processor is further to:
  calculate an access group score that includes a value to reflect a type of the access restrictions assigned to a piece of media content in the group of relevant media content.

11. The device of claim 2, where, when associating the plurality of sub-scores with each piece of media content in the group of relevant media content, the processor is further to:
  calculate a user media score that includes a value to reflect a preference, by a user of the user device, for a particular type of media, or calculate a device preference score that includes a value to reflect a preference, of a user, to present a type of media content on the user device.

12. The device of claim 2, where device is a server within the content delivery network.

13. The non-transitory computer-readable medium of claim 3, wherein the media content with the content delivery network includes one or more of:
   video files,
   audio files, and
   image files.

14. The non-transitory computer-readable medium of claim 3, wherein the one or more instructions to associate the plurality of sub-scores with each piece of media content in the group of relevant media content comprises one or more instructions to:
   calculate an interface score that includes a value to reflect a capability, of the user device, to present particular types of media.

15. The method non-transitory computer-readable medium of claim 3, wherein a type of the access restrictions includes one of:
   a personal content designation,
   a partially-shared content designation, or
   a public content designation.

16. The method of claim 5, where the user device is one of:
   a radiotelephone,
   a personal communications system (PCS) terminal,
   a personal digital assistant (PDA),
   a laptop computer,
   a tablet computer,
   a personal computer,
   a set top box (STB),
   a television,
   a personal gaming system, or
   a content recording device.

17. The device of claim 9, where the user device is one of:
   a radiotelephone,
   a personal communications system (PCS) terminal,
   a personal digital assistant (PDA),
   a laptop computer,
   a tablet computer,
   a personal computer,
   a set top box (STB),
   a television,
   a personal gaming system, or
   a content recording device.

\* \* \* \* \*